(12) United States Patent
Bakthavatchalam et al.

(10) Patent No.: US 11,714,909 B2
(45) Date of Patent: Aug. 1, 2023

(54) REAL-TIME MALWARE DETECTION

(71) Applicant: Redberry Systems, Inc., Los Altos Hills, CA (US)

(72) Inventors: Madhavan Bakthavatchalam, Fremont, CA (US); Sandeep Khanna, Los Altos, CA (US); Varadarajan Srinivasan, Los Altos Hills, CA (US)

(73) Assignee: Redberry Systems, Inc., Los Altos Hills, CA (US)

( * ) Notice: Subject to any disclaimer, the term of this patent is extended or adjusted under 35 U.S.C. 154(b) by 422 days.

(21) Appl. No.: 17/109,387

(22) Filed: Dec. 2, 2020

(65) Prior Publication Data

US 2021/0165880 A1   Jun. 3, 2021

Related U.S. Application Data

(63) Continuation of application No. 15/791,644, filed on Oct. 24, 2017, now Pat. No. 10,885,192.

(60) Provisional application No. 62/412,590, filed on Oct. 25, 2016.

(51) Int. Cl.
  *G06F 21/56* (2013.01)
  *H04L 29/06* (2006.01)
  *H04L 9/40* (2022.01)

(52) U.S. Cl.
  CPC .......... *G06F 21/567* (2013.01); *G06F 21/566* (2013.01); *H04L 63/0245* (2013.01); *H04L 63/145* (2013.01); *H04L 63/1416* (2013.01); *H04L 63/0263* (2013.01)

(58) Field of Classification Search
  CPC . G06F 21/566; G06F 21/567; H04L 63/0245; H04L 63/1416; H04L 63/145; H04L 63/0263
  See application file for complete search history.

(56) References Cited

U.S. PATENT DOCUMENTS

| | | |
|---|---|---|
| 9,158,893 B2 | 10/2015 | Call et al. |
| 10,885,192 B2 | 1/2021 | Bakthavatchalam et al. |
| 2005/0216770 A1 | 9/2005 | Rowett et al. |
| 2008/0071765 A1* | 3/2008 | Ichiriu .............. G06F 16/90344 707/999.005 |

(Continued)

OTHER PUBLICATIONS

K. Peng, S. Tang, M. Chen and Q. Dong, "Chain-Based DFA Deflation for Fast and Scalable Regular Expression Matching Using TCAM," 2011 ACM/IEEE Seventh Symposium on Architectures for Networking and Communications Systems, Brooklyn, NY, USA, 2011, pp. 24-35, doi: 10.1109/ANCS.2011.13. (Year: 2011).*

(Continued)

*Primary Examiner* — Joseph P Hirl
*Assistant Examiner* — Thomas A Gyorfi
(74) *Attorney, Agent, or Firm* — Charles Shemwell (57) ABSTRACT

Upon receiving malware detection rules that are to be identified with respect to an input traffic stream, a rule database that requires less storage capacity than the malware detection rules is generated by substituting tokens for selected symbol strings within the malware detection rules. A compressed traffic stream is generated by substituting the tokens for instances of the selected symbol strings within the input traffic stream, and then compared with the rule database to determine whether the input traffic stream contains one or more symbol sequences that correspond to any of the malware detection rules.

20 Claims, 8 Drawing Sheets

(56) References Cited

U.S. PATENT DOCUMENTS

2009/0070459 A1     3/2009    Cho et al.
2017/0147815 A1     5/2017    Pedersen et al.

OTHER PUBLICATIONS

K. Peng, Q. Dong and M. Chen, "TCAM-based DFA deflation: A novel approach to fast and scalable regular expression matching," 2011 IEEE Nineteenth IEEE International Workshop on Quality of Service, San Jose, CA, USA, 2011, pp. 1-3, doi: 10.1109/IWQOS.2011.5931323. (Year: 2011).*

K. Huang, L. Ding, G. Xie, D. Zhang, A. X. Liu and K. Salamatian, "Scalable TCAM-based regular expression matching with compressed finite automata," Architectures for Networking and Communications Systems, San Jose, CA, USA, 2013, pp. 83-93, doi: 10.1109/ANCS.2013.6665178. (Year: 2013).*

D. Pao and X. Wang, "Multi-stride string searching for high-speed content inspection," Comput. J., vol. 55, No. 10, pp. 1216-1231, Oct. 2012.

D. Pao, N. L. Or, and R. C. C. Cheung, "A memory-based NFA regular expression match engine for signature-based intrusion detection," Comput. Commun., vol. 36, pp. 1255-1267, 2013.

D. Pao, W. Lin, and B. Liu, "A memory efficient pipelined implementation of the Aho-Corasick string matching algorithm," ACM Trans. Archit. Code Optim., vol. 7, article 10, 2010.

D. Pao, W. Lin, and B. Liu, "Pipelined architecture for multi-string matching," IEEE Computer Archit. Letters, vol. 7, No. 2, pp. 33-36, Jul.-Dec. 2008.

D. Pao, X. Wang, X. Wang, C. Cao, and Y. Zhu, "String searching engine for virus scanning," IEEE Trans. Comput., vol. 60, No. 11, pp. 1596-1609, Nov. 2011.

International Preliminary Report on Patentability dated May 9, 2019 in International Application No. PCT/US2017/057984, 8 pages.

International Search Report and Written Opinion dated Jan. 18, 2018 in International Application No. PCT/US2017/057984, 11 pages.

Or et al., "Memory-Based Hardware Architectures to Detect ClamAV Virus Signatures with Restricted Regular Expression Features," IEEE Transactions on Computers, IEEE USA, vol. 65, No. 4, Apr. 2016, pp. 1225-1238.

Wang et al., "Hardware Accelerator to Detect Multi-Segment Virus Patterns," Computer Journal, Section D: Security in Computer Systems and Networks, vol. 58, No. 10, Aug. 22, 2014, pp. 2443 2460.

Yu et al., "Gigabit Rate Packet Pattern-Matching Using TCAM," IEEE, Proceeding of the 12th IEEE International Conference on Network Protocols (ICNP'04) in Berlin, Germany, Oct. 2004, 10 pages.

* cited by examiner

FIG. 3
Rule Search Engine Operational Flow

FIG. 4
Rule Compression Engine Operational Flow

FIG. 5
Stringlet/Token Pairing

FIG. 12
Multi-Symbol (α) Advance

FIG. 17 Rule Search Memory

FIG. 16 Rule Search Memory Operational Flow

FIG. 18 Flow Management Module Operational Sequence

REAL-TIME MALWARE DETECTION

CROSS REFERENCE TO RELATED APPLICATIONS

This application is a continuation of U.S. patent application Ser. No. 15/791,644 filed Oct. 24, 2017 (now U.S. Pat. No. 10,885,192), which claims priority to U.S. Provisional Patent Application No. 62/412,590 filed Oct. 25, 2016. Each of the above-identified patent applications is hereby incorporated by reference.

TECHNICAL FIELD

The present disclosure relates to network security.

BACKGROUND

The proliferation and ever-increasing sophistication of malware in its various forms—viruses, worms, advanced persistent threat (APT), distributed-denial-of-service (DDoS) attach or any other code or traffic that represents an actual or potential security threat—has traditionally been countered by software-based detection schemes that favor tractability over execution speed. As network data rates escalate, however, the malware detection bottleneck is becoming increasingly problematic, constraining network performance particularly in high-throughput enterprise caliber networks.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments disclosed herein, network traffic is compressed and then malware-searched within a hardware-accelerated rule search engine. In a number of embodiments, the rule search engine includes one or more content addressable memory (CAM) components that enable massively-parallel compression-code lookup and malware-signature search operations—an architecture that enables robust, cost-effective malware detection at the nominal data rate of the input media (e.g., at "line rate" and thus in real-time), avoiding the detection bottlenecks that plague more conventional software-based approaches while limiting costly hardware component count.

Figure 1:
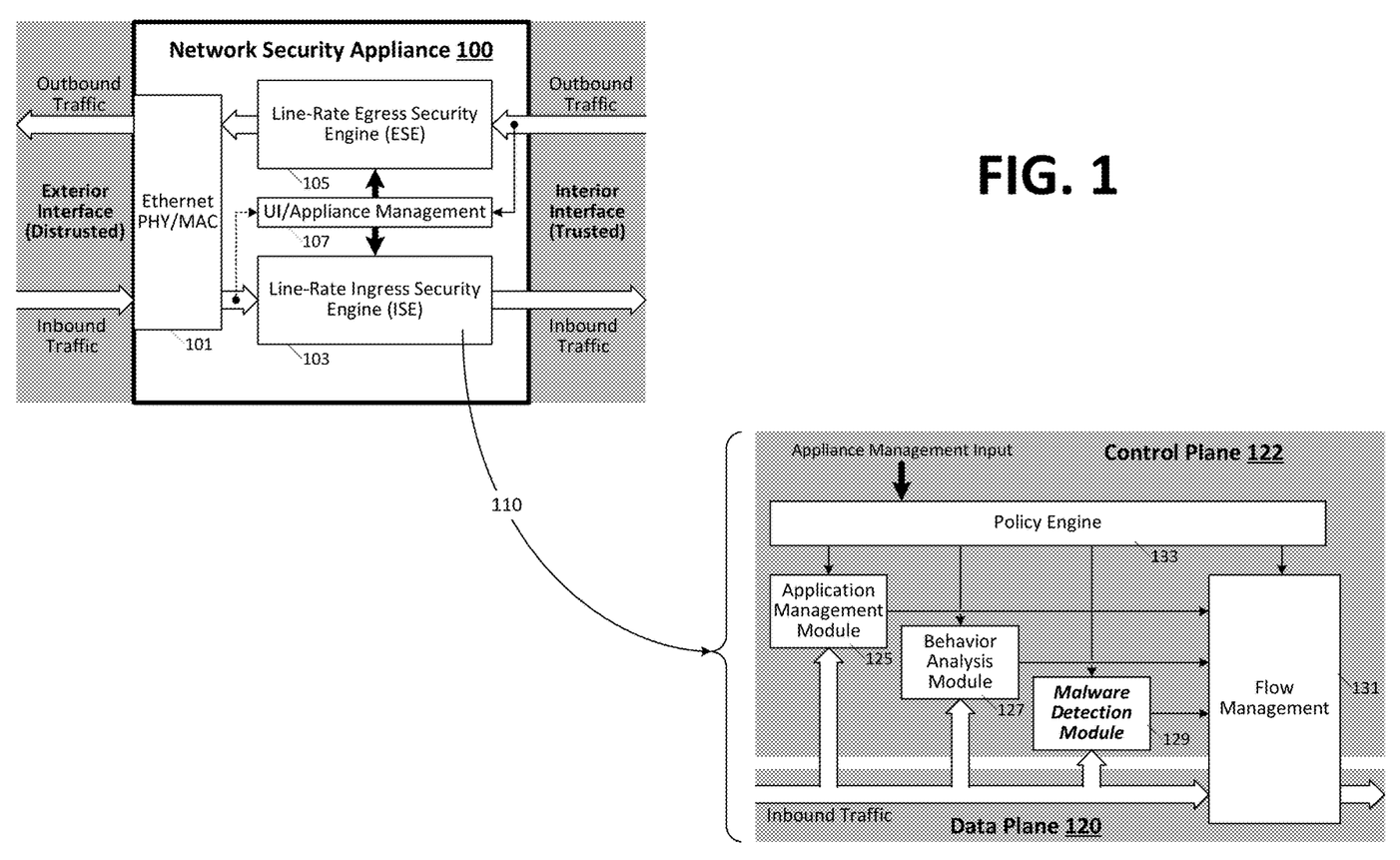
FIG. 1 illustrates an embodiment of a network security appliance or device that executes line-rate malware detection with respect to packetized network traffic flowing between an interface to a distrusted exterior network and an interface to a nominally trusted interior network.

FIG. 1 illustrates an embodiment of a network security appliance or device 100 that executes line-rate malware detection with respect to packetized network traffic flowing between an interface to a distrusted exterior network ("exterior interface"—e.g., Internet interface) and an interface to a nominally trusted interior network ("interior interface"). While appliance 100 (which may constitute or be part of a firewall and/or carry out various other network functions such as traffic switching/routing, access control, deduplication, accounting, etc.) is depicted as having an Ethernet-based exterior interface (implementing at least physical (PHY) and media-access control (MAC) layers of the Ethernet stack as shown at 101) and a more generalized interior interface, various alternative or more specific network interfaces may be used on either or both sides of the appliance, including proprietary interfaces where necessary. Also, while separate (split) inbound and outbound traffic paths are shown, a single bidirectional path may be implemented with respect to either or both of the exterior and interior interfaces.

At its core, network security appliance 100 implements a pair of line-rate security engines 103 and 105, each coupled to a user-interface/appliance-management module 107. In the split-traffic embodiment shown, line-rate security engine 105 executes security and control operations with respect to traffic egressing from the interior network to the exterior network (i.e., outbound traffic) and is thus referred to as an "egress security engine" (ESE), while line-rate security engine 103 executes security and control operations with respect to traffic ingressing from the exterior network to the interior network (i.e., inbound traffic) and is referred to accordingly herein as an "ingress security engine" (ISE). While the ingress and egress security engines generally implement asymmetric security and control functions (due, for example, to disparate trust in the respective networks from which they receive traffic), both security engines may carry out the same or similar operations with respect to traffic flows and/or contain same or similar architectural components. Accordingly, while various security and control structures and operations discussed with respect to embodiments below focus on traffic inbound from the distrusted exterior network and thus security architectures within ingress security engine 103, in all cases such structures and operations may be implemented within egress security engine 105 to provide security/control with respect to outbound traffic. Also, though shown and described as separate security engines, the ingress and egress security engines may be merged into a single security engine that executes security/control actions with respect to inbound and/or outbound traffic, particularly in implementations that manage traffic over a bidirectional path between either or both of the exterior and interior interfaces.

FIG. 1 also depicts an exemplary detail-view (110) of ingress security engine 103 and its general organization into a data plane 120 through which packetized network traffic flows (preferably but not necessarily at line rate) and a control plane 122 that carries out control and management operations with respect to the network traffic. As shown, control plane 122 includes a policy engine 133, application management module 125, behavior analysis module 127 and malware detection module 129, the latter being the particular focus of various embodiments discussed below. Control plane 122 and data plane 120 jointly contribute to traffic flow management within a flow management unit 131 and, though not specifically shown, data plane 120 may additionally include one or more buffers to queue or otherwise store traffic supplied to control plane modules 125, 127 and 129 and/or flow management unit 131.

In general, policy engine 133 enables application-tailored operation within ingress security engine 103, applying input from user-interface/appliance-management unit 107 (e.g., user input received via a dedicated user interface and/or included within traffic from the trusted network or, with appropriate safeguards, from the exterior network) to control operation within control plane modules 125, 127, 129 and flow management unit 131. In the case of malware detection module 129, for example, policy engine 133 may supply (with or without processing) malware signatures or "rules"—continuous or disjointed strings of symbols that correspond to known malware implementations—that are to be detected within inbound traffic and reported to flow management unit 131. As discussed below, flow management unit 131 may take various actions with respect to reported malware detections, including blocking malware-infested traffic flows and/or seizing information with respect to such flows to enable forensic or other advanced security measures.

Figure 2:
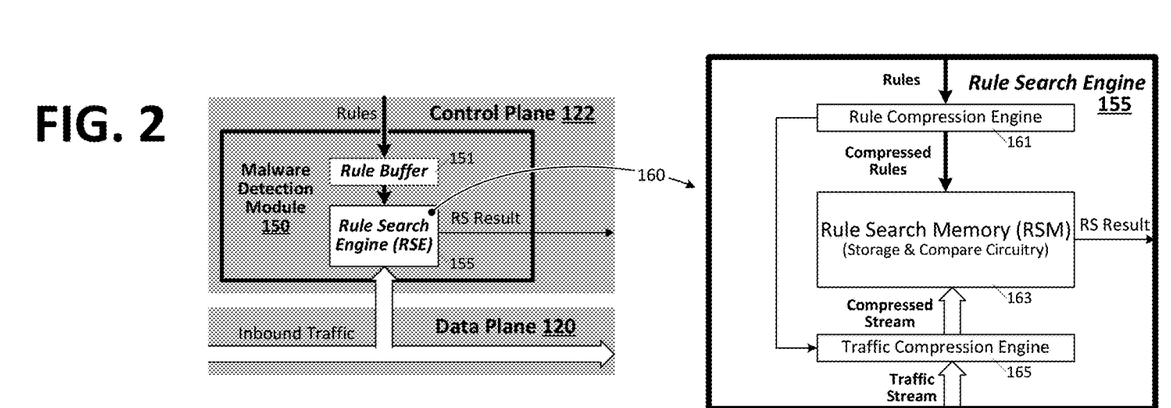
FIG. 2 illustrates an embodiment of a malware detection module having a rule buffer and a hardware-accelerated rule search engine.

FIG. 2 illustrates an embodiment of a malware detection module 150 (e.g., that may be deployed within the ingress security engine 103 of FIG. 1) having a rule buffer 151 and a hardware-accelerated rule search engine 155. As shown, rule buffer 151 receives rules from a source within control plane 122 (e.g., policy engine 133 of FIG. 1) and forwards or otherwise makes those rules available to rule search engine 155. Rule search engine 155 additionally receives inbound traffic from the data plane 120 and outputs a rule-search result ("RS Result") to notify downstream functional blocks (e.g., flow management 131 unit of FIG. 1) of a malware detection event upon confirming a match between a rule (malware signature) and contents of the inbound traffic.

Still referring to FIG. 2, while inbound traffic is delivered at line-rate (i.e., according to network bandwidth) and in real-time (i.e., as the traffic arrives), rule delivery and other control plane operations (e.g., configuration operations, etc.) may occur at slower rates and/or during times of relatively low traffic or even zero traffic (e.g., where run-time operation of the host network security appliance is suspended for maintenance or other down-time). Moreover, rules may be delivered alternatively as a full set of replacement rules (e.g., delivering a completely new database or library of rules) and/or as occasional updates to a previously delivered or accumulated rule database. Accordingly, depending on the rule delivery rate and/or rule format (update vs. complete database), temporary storage of rules prior to delivery and implementation within rule search engine may be unnecessary, making buffer 151 an optional feature as indicated by its depiction in dashed outline (a drawing convention used generally herein, though features shown without dashed line or dashed outline may also be optional unless explicitly stated otherwise).

In one embodiment, shown in detail view 160, rule search engine 155 includes a rule compression engine 161, traffic compression engine 165 and rule search memory 163 (RSM). Incoming rules (e.g., from rule buffer 151 or other source within control plane 122) are supplied to rule compression engine 161 which, in turn, replaces repetitiously appearing strings of characters with substantially smaller "tokens" (also referred to herein as encoded characters) to yield a compressed version of the rules for storage within rule search memory 163. This rule compression enables a substantial reduction in the rule storage capacity of rule search memory 163 (i.e., relative to that required to store uncompressed rules), a particularly beneficial savings in hardware-accelerated implementations of rule search memory 163 as the number of relatively expensive and power-hungry hardware search components (e.g., CAM components) can be kept practicably low.

As a matter of terminology, repeated character strings within the rules supplied for storage within rule search memory 163 are referred to herein as "stringlets," with each stringlet being qualified as either "paired" or "unpaired" according to whether rule compression engine 161 does or does not designate the stringlet for replacement by a token, respectively. In one embodiment, each stringlet designated by the rule compression engine for substitution (i.e., replacement by a token) is paired one-for-one with a unique token (i.e., a token different from tokens paired with any and all other stringlets) so that the stringlet and its token constitute a unique stringlet/token pair. The total number of stringlet/token pairs may be constrained by the number of available tokens, which may itself be a function of the token encoding methodology. For example, in an embodiment in which input traffic is constituted by a stream of eight-bit data elements ("symbols") that are themselves constrained to the 128-symbol ANSI ASCII character set, the token pool (i.e., set of allocable tokens) may be constituted by all or a portion of the eight-bit symbols not otherwise included in the ASCII character set, thus constraining the token pool itself to 128 or fewer symbols. In a more general embodiment in which each symbol within an incoming stream of n-bit data elements may have any of $2^n$ values (i.e., symbol value is unconstrained), rule search engine 155 may implement symbol expansion with respect to incoming rules and traffic to increase the internally managed symbol size by one or more bits and thus create headroom for token substitution. In a number of embodiments, for example, rule compression engine and traffic compression engine expand incoming streams of 8-bit symbols (conveying rules and traffic, respectively) into internal streams of 9-bit symbols, with each internal-stream symbol representing either (i) a corresponding one of the 8-bit input data symbols, for example, with an additional bit pre-pended, appended or embedded, or (ii) one of 256 tokens in the additional code space effected by the bit-width expansion (note that a pool of fewer than 256 tokens may be allocated to reserve part of the code space for other purposes, and a pool of more than 256 tokens may be allocated where incoming symbol values are constrained to a subset of the native 8-bit code space). In other embodiments, unused encoding space in other symbol sets may be allocated to the token pool (e.g., unused encoding space in Unicodes or other standards-based coding arrangements having more or fewer than eight bits, or even in non-standard 9-bit or 10-bit encodings of the 128-character ASCII character set). Also, while token size is generally assumed to be uniform across the token pool in embodiments discussed below, non-uniform token sizes may be implemented in alternative embodiments (e.g., rule compression engine 155 assigning n-bit tokens to some stringlets and 2n-bit tokens to others).

In the embodiment of FIG. 2, stringlet/token pairs established by rule compression engine 161 are applied to the incoming rule set to produce a compressed, searchable rule set for storage within rule search memory 163. The stringlet/token pairs are also supplied to traffic compression engine 165 which, in response, executes a counterpart token substitution within the incoming traffic stream to render a compressed traffic stream to rule search memory 163. By this arrangement, a malware signature within the incoming traffic stream is subject to the same stringlet/token encoding as the rules stored within the rule search memory—symmetric rule and traffic compression that ensures detection of a traffic-borne malware signature within the compressed input stream.

Figure 3:
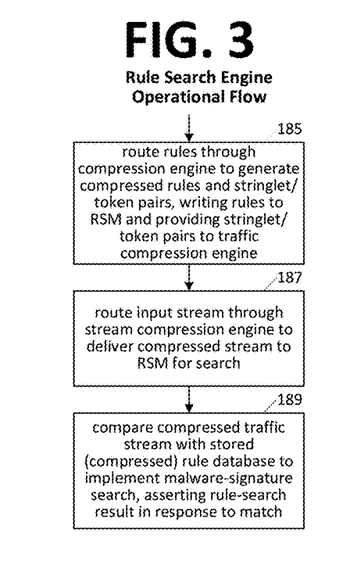
FIGS. 3 and 4 illustrate exemplary operational sequences within the rule search engine and rule compression engine of FIG. 2, respectively.
Figure 4:
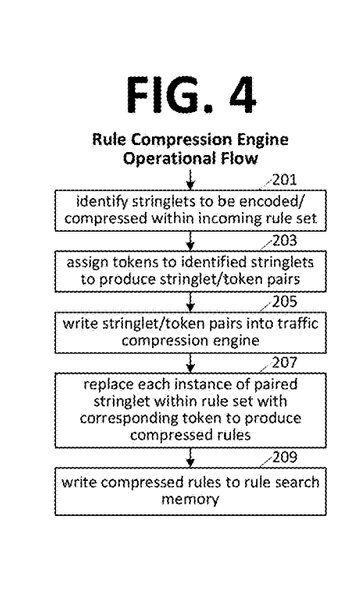

FIGS. 3 and 4 illustrate exemplary operational sequences within the rule search engine and rule compression engine of FIG. 2, respectively. Starting at 185, incoming rules are routed through the compression engine to generate stringlet/token pairs and compressed rules (in which stringlets are replaced by counterpart tokens), with the latter being written to the rule search memory and the stringlet/token pairs being supplied to the traffic compression engine. Thereafter, incoming traffic is routed through the traffic compression engine to deliver the compressed stream to the rule search memory (187), and at 189, the rule search memory searches the compressed traffic stream for malware signatures (i.e., through comparison with the stored, compressed rule database) asserting a rule-search result signifying match events.

Referring to FIG. 4, the rule compression engine identifies stringlets to be encoded (i.e., replaced with tokens and thus compressed) within the incoming rule set at 201, and assigns encoded characters (tokens) to some or all of the identified stringlets at 203, thus forming stringlet/token pairs. At 205, the rule compression engine writes the stringlet/token pairs to the traffic compression engine (e.g., populating a CAM-based look-up memory therein as discussed below) and then generates the compressed rules at 207 (replacing paired stringlets with counterpart tokens) and writes the compressed rules to the search memory at 209.

Figure 5:
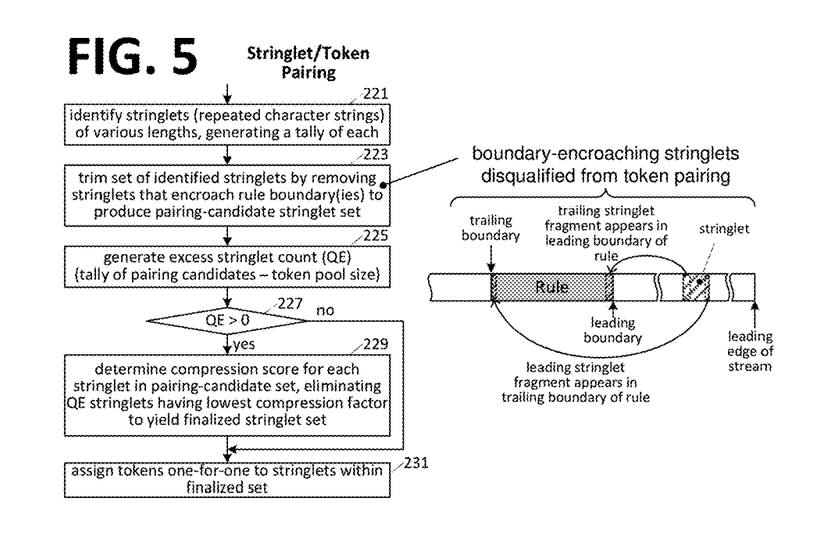
FIG. 5 illustrates an exemplary approach to stringlet/token pairing implemented within the rule compression engine of FIG. 2.

FIG. 5 illustrates an exemplary approach to stringlet/token pairing implemented within the rule compression engine of FIG. 2—activities corresponding to operations 201 and 203 of FIG. 4. Starting at 221, the rule compression engine scans an incoming rule set (or rule update) to identify stringlets of various lengths therein, generating a count of each stringlet instance (i.e., tallying number of times a particular stringlet appears in the rule set/rule update). Though not specifically shown, lengths of identified stringlets may be constrained by maximum and minimum values, with the minimum length established, for example, according to a minimum compression ratio (i.e., stringlets below the minimum length representing insufficient compression to warrant the search/replace overhead) and the maximum length set according to hardware constraints and/or to optimize performance in view of hardware implementation.

At 223, stringlets that appear fractionally in the leading or trailing boundaries of one or more rules are removed (trimmed) from the identified stringlets to yield a set of pairing candidates—stringlets that are candidates for pairing with counterpart tokens. More specifically, understanding each rule and stringlet to be an ordered sequence of symbols having leading and trailing boundaries (i.e., initial and final symbols received in a symbol stream), if a leading or trailing fragment (fraction less than the whole) of a given stringlet appears in the trailing boundary or leading boundary, respectively, of any rule within the incoming rule set (i.e., one or more leading symbols of the stringlet, but not the entire stringlet, appear in the trailing boundary of a rule, or one or more trailing symbols of the stringlet appear in the leading boundary of the rule), then token substitution for such a "boundary encroaching" stringlet is disallowed to prevent potential obfuscation of that rule within a live traffic stream.

Still referring to FIG. 5, at 225, an excess stringlet count (QE) is determined by subtracting the token pool size (number of available tokens) from the number of pairing-candidate stringlets (i.e., the difference between those quantities indicating the number of excess candidates). If the number of pairing candidates exceeds the available token count (i.e., QE>0 and thus affirmative determination at 227), then those pairing candidates that yield the lowest compression score are eliminated at 229 to yield a finalized set of stringlets according to the number of available tokens (i.e., QE pairing-candidate stringlets are eliminated at 229). In one embodiment, for example, a compression score is calculated for each candidate stringlet by multiplying the instance count for that stringlet (i.e., number of times the stringlet appears in the rule set) by the difference between stringlet size and token size. For example, assuming that token size is that of a single symbol, a 5-symbol stringlet that appears 100 times in a given rule set would yield a compression score of 100*(5−1)=400, while a 25-symbol stringlet that appears 10 times within that same rule set would yield a lower compression score of 10*(25−1)=240. In these examples, the compression score corresponds to the symbol-count reduction that would result from replacing the candidate stringlet with a token, though other types of compression scores that account for other considerations may be used in alternative embodiments (e.g., weighting the compression score for strings over/under a given threshold length differently, eliminate smallest-size or largest-size stringlets, even-out stringlet length distribution in final stringlet set, weighting to favor stringlet sizes that yield better hardware performance, etc.). However the compression score is determined or stringlet population trimmed, each stringlet in the finalized set is paired one-for-one with a respective token at 231 to complete the stringlet/token pairing.

Returning briefly to FIG. 2, while incoming rules and live traffic are ostensibly subject to identical compression processing within compression engines 161 and 165, the presence of two different compression engines may, in some applications or instances, render the host malware detection module susceptible to undesired compression discrepancies. For example, in a tractable implementation that permits the compression behavior to be changed according to user input (e.g., policy selection) and/or subject to occasional software or microcode change, the configurations (and/or operating modes) of the two compression engines may temporarily diverge (e.g., where one engine is updated before the other).

Figure 6:
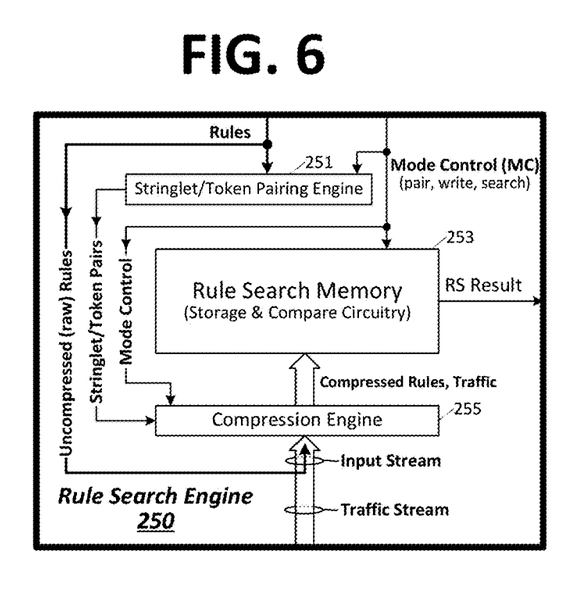
FIG. 6 illustrates an alternative embodiment of a rule search engine that avoids potentially disparate rule/traffic compression by routing both rules and traffic through a single compression engine.
Figure 7:
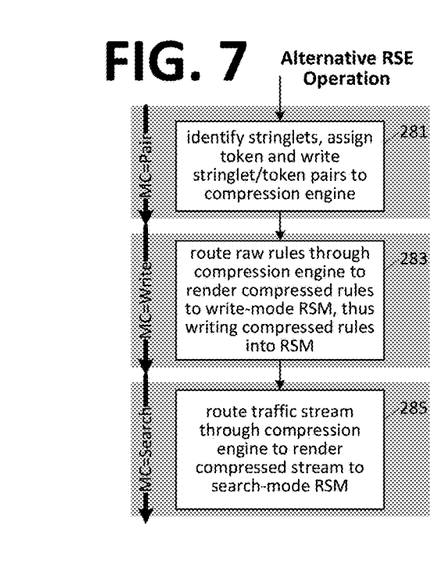
FIG. 7 illustrates an exemplary operation of the rule search engine of FIG. 6 as the mode control field transitions between these different modal settings.
Figure 8:
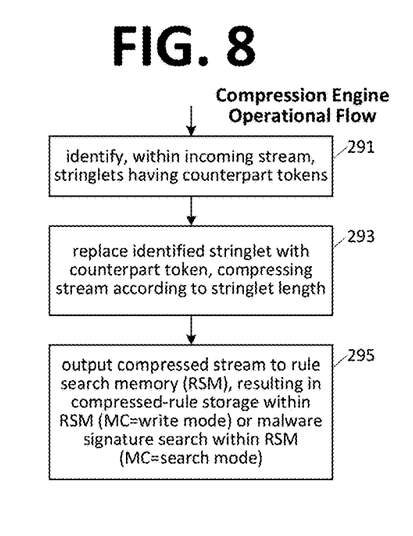
FIG. 8 illustrates an example of write-mode/search-mode operation within the compression engine depicted in FIG. 6, showing identification of paired stringlets within the input stream, token substitution, and compressed stream output.

FIG. 6 illustrates an alternative embodiment of a rule search engine 250 that avoids potentially disparate rule/traffic compression by routing both rules and traffic through a single compression engine. More specifically, the separate traffic and rule compression engines 165 and 161 shown in FIG. 2 are replaced by a more generalized compression engine 255 and stringlet/token pairing engine 251, respectively, with both of those engines and a rule search memory 253 being subject to a mode control field (MC). In the implementation shown, the mode control field (which may be provided by policy engine 133 of FIG. 1 or other control plane components) specifies, at different times, a pairing mode, write mode and search mode of operation within rule search engine 250. FIG. 7 illustrates an exemplary operation of rule search engine 250 as the mode control field transitions between these different modal settings. In pairing mode (281), stringlet/token pairing engine 251 executes the stringlet/token pairing and pair-writing operations generally as shown at 201, 203 and 205 of FIG. 4 with respect to incoming rules, except with pair-writing directed to compression engine 255 (i.e., instead of the more specialized traffic compression engine shown in FIG. 2). Upon transition to write mode (283), uncompressed rules are routed to the input-stream interface of compression engine 255 which, in turn, executes a rule compression function, substituting tokens for identified instances of paired stringlets to render compressed rules to rule search memory 253. Rule search memory 253 responds to the write-mode setting of the mode control field by storing the compressed rules received from compression engine 255 within internal search memory (which may include one or more CAMs as discussed below), thus completing write-mode operation. Upon transitioning to search mode at 285 (i.e., after rules have been compressed and written to the rule search memory), input traffic is routed through compression engine 255 to render a compressed stream to rule search memory. FIG. 8 illustrates an example of the above-described write-mode/search-mode operation of compression engine 255 graphically, showing identification of paired stringlets within the input stream at 291 (the input stream conveying uncompressed rules during write mode, and uncompressed traffic during search mode), token substitution at 293, and compressed stream output at 295.

Figure 9:
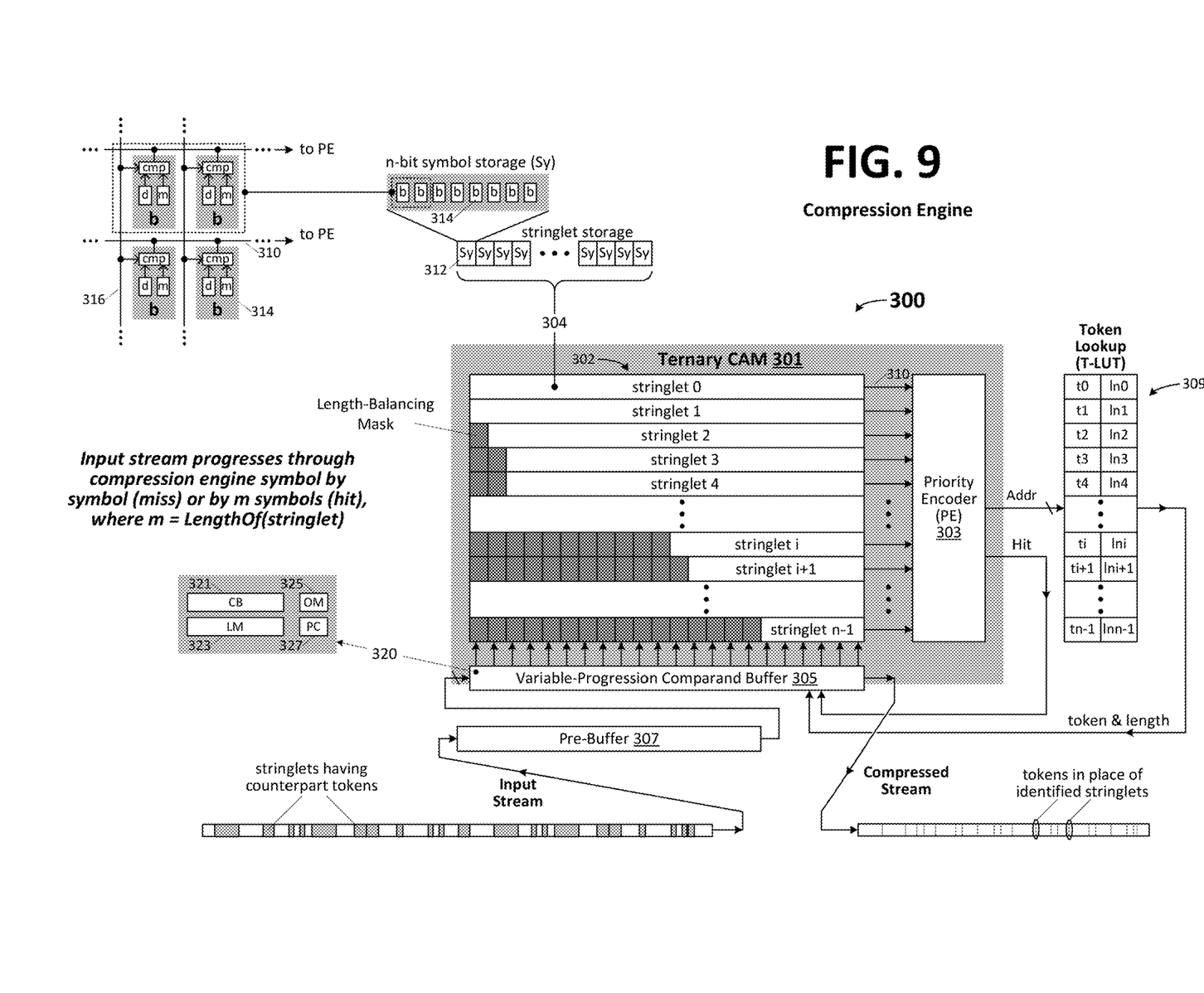
FIG. 9 illustrates an embodiment of a CAM-driven (content-addressable-memory-driven) compression engine that may be used to implement various compression engines discussed in reference to FIGS. 2-8.

FIG. 9 illustrates an embodiment of a CAM-driven compression engine 300 that may be used to implement the various compression engines discussed above. As shown, compression engine 300 includes a ternary CAM 301 to carry out stringlet storage and search operations, and also a pre-buffer 307 to receive and buffer the incoming symbol stream (e.g., rules or live traffic) and a lookup table 309 to store tokens and string-length values corresponding to the CAM-resident strings. Ternary CAM 301 itself includes CAM cell array 302 in which stringlets are stored (i.e., stringlets forming a stringlet database and having counterpart tokens) together with a priority encoder 303 and variable-progression comparand buffer 305, the latter of which may be implemented by a commodity ternary-CAM comparand buffer and additional logic circuits internal or external to ternary CAM 301 as discussed below. Also, while lookup table 309 is generally shown as being distinct from (and indexed by the output of) CAM 301 in the embodiment of FIG. 9 and in other CAM-driven compression engines described below, in all such cases the contents of the lookup table may instead be implemented by internal or associated storage within the CAM, the contents of which are output selectively according to matched CAM entries (i.e., like a lookup table that has been subsumed into the CAM component).

In one embodiment, ternary CAM 301 executes stringlet searches in successive, compare cycles, comparing the contents of the comparand buffer with the entirety of the stringlet database in each cycle (i.e., a massively-parallel compare) to yield either a database hit or miss. In the event of a miss (no stringlet match), CAM-hit signal ('Hit') is deasserted by priority encoder 303, and contents of variable-progression comparand buffer 305 are advanced (shifted forward) by one symbol, with the leading (least-recently loaded, head-of-queue) symbol in buffer 303 being evicted to become part of the compressed output stream, and a new symbol drawn from the pre-buffer (i.e., from a head-of-queue location therein) to fill the tail-of-queue vacancy created within the variable-progression comparand buffer. In the event of a match between contents of buffer 305 (the "comparand") and the stringlet database within CAM array 302, a match line (310) corresponding the comparand-matching stringlet is activated, causing priority encoder 303 to encode and output an address corresponding to the activated match line (and thus the matching stringlet) and also assert the CAM-hit signal. The address ('Addr') is applied to token lookup table 309, selecting an entry therein containing a token and stringlet length (i.e., number of constituent symbols) corresponding to the matched stringlet to be fed back to variable-progression comparand buffer 305.

In the particular embodiment shown, stringlets are loaded in ascending row order within the CAM cell array 302 according to stringlet size (i.e., longer stringlets in lower-numbered CAM rows) and priority encoder 303 is configured to resolve between multiple match results (i.e., two or more match lines activated in the same search cycle—a possibility where a shorter stringlet occurs within a longer one) by prioritizing matches for lower-numbered CAM rows ahead of matches with higher-numbered CAM rows. Accordingly, if a given comparand matches two or more stringlets (i.e., multiple match lines activated simultaneously), priority encoder 303 will output an address according to the stringlet stored in the lowest-numbered row and thus the longest stringlet. Moreover, in the depicted implementation, stringlets are stored right-justified with unused locations in the left margin masked (i.e., on the left side of the stored stringlet as shown by shading), effectively balancing/equalizing the storage allocated to each string, independent of string-length.

Detail view 304 depicts an exemplary stringlet storage within a given CAM row, illustrating storage of constituent bits of each symbol 312 within the subject stringlet within respective bitwise CAM cells 314 (b). In the embodiment shown, each CAM cell 314 includes a data-bit storage element ('d') and mask-bit storage element ('m') together with a compare circuit ('cmp') that receives the stored data and mask bits, as well as a comparand bit driven from buffer 305 onto column line 316. The compare circuits within the CAM cells of a given row are coupled in parallel to the match line 310 for that row and perform respective bitwise compare operations between comparand bits (supplied on respective column lines 316) and stored stringlet bits. In one embodiment, each match line 310 is pulled high through a pull-up resistance and, during a compare operation, the compare circuit within each CAM cell 314 pulls the match line down in response to a data-bit/comparand-bit mismatch. By this operation, CAM cells 314 within a given row signal a mismatch ("miss") for the stored stringlet stored therein when any one or more bits of the stringlet fail to match the comparand driven onto bit lines 316. Unused portions of the CAM row are masked by storage of a mask bit in a state that disables or blocks mismatch detection within the corresponding compare circuit (e.g., disables match-line pull-down). Other logical arrangements may be used to signal match/mismatch and/or perform masking operations with respect to individual stringlets in alternative embodiments. For example, instead of providing a mask storage element per CAM cell 314, a single mask storage element may be shared among all the CAM cells of a symbol storage element (e.g., one mask bit for every N-bit symbol storage), particularly where the ternary CAM is implemented in a programmable component (e.g., programmable logic device (PLD), programmable gate array (PGA), field programmable gate array (FPGA) or other component that enables flexible/tractable hardware allocation).

Still referring to FIG. 9, variable-progression comparand buffer 305 controls the cycle-to-cycle advance (progression) of the incoming symbol stream through the compression engine in accordance with the hit/miss signal from ternary CAM 301 and token-lookup information from table lookup 309 (i.e., paired token and stringlet length values)—advancing the symbol stream by a single symbol in response to a CAM miss, and by multiple symbols in response to a CAM hit in accordance with the length of the matched stringlet. In one embodiment, shown in detail view 320, variable-progression comparand buffer includes a comparand buffer 321 (CB) coupled to the column (comparand) bit lines 316 of CAM cell array 302, a load multiplexer 323 (LM) to control loading and shifting of contents within comparand buffer 321, an output multiplexer 325 (OM) to forward either a token (CAM hit) or head-of-stream symbol (CAM miss) into the compressed output stream, and a progression controller 327 (PC) to control the load multiplexer and output multiplexer in accordance with the hit/miss signal and stringlet length value from the token lookup table. Exemplary connections and coordination among these component elements of variable-progression comparand buffer 305 are described below.

Figure 10:
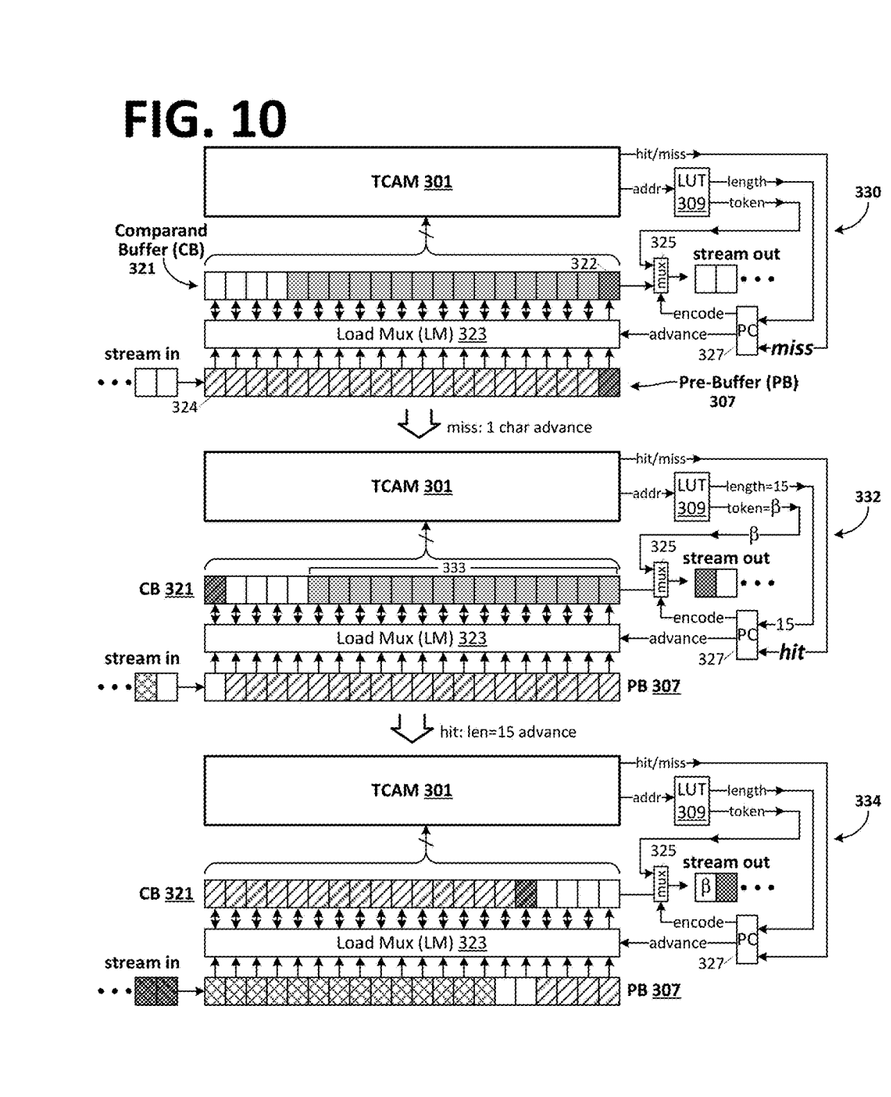
FIG. 10 illustrates an exemplary traffic flow through the compression engine of FIG. 9, showing progression of the input symbol stream through internal components of the variable-progression comparand buffer described above over a sequence of compare cycles.

FIG. 10 illustrates an exemplary traffic flow through the compression engine 300 of FIG. 9, showing progression of the input symbol stream through internal components of the variable-progression comparand buffer described above over a sequence of compare cycles. In the particular embodiment shown, the comparand buffer 321 and pre-buffer 307 implement respective symbol storage queues (or first-in-first-out buffers, FIFOs), with comparand buffer 321 having a head-of-queue symbol storage 322 coupled to output multiplexer 325 and pre-buffer 307 having a tail-of-queue symbol storage 324 coupled to receive the incoming symbol stream. Load multiplexer 323 is coupled to receive N symbols from the pre-buffer (N being the maximum single-cycle symbol progression and, in at least one embodiment, the length of the longest stringlet within the stringlet database) and N−1 symbols from the comparand buffer—all but head-of-queue symbol 322—and responds to an advance signal ('advance') from progression controller 327 by shifting the contents of the comparand buffer and pre-buffer toward the compression engine output (output of multiplexer 325) by a variable number of symbols in accordance with the hit/miss signal and stringlet length values ("length") from ternary CAM 301 and lookup table 309. Referring first to the comparand buffer status shown at 330, progression controller 327 responds to an exemplary TCAM 'miss' by issuing an advance signal that shifts the contents of pre-buffer 307 and comparand buffer 321 forward by a single symbol (i.e., as if the pre-buffer and comparand buffer are concatenated to form a unified shift register) such that tail of the pre-buffer is loaded with an input stream symbol, the tail of the comparand buffer is loaded with the symbol from the head of the pre-buffer and the head of the comparand buffer is evicted. Progression controller 327 also deasserts an 'encode' signal (i.e., in response to the TCAM miss) at the control input of output multiplexer 325, causing the output multiplexer to pass the head-of-queue symbol evicted from the comparand buffer 321 into the output stream. The resulting pre-buffer, comparand buffer and output stream status is shown at 332.

Starting now from the configuration at 332, an affirmative search/match result is assumed with respect to the 15-symbol stringlet shown by uniform shading at 333, with the TCAM responsively asserting a hit signal, and indexing lookup table 309 to yield a stringlet length value (15 in this example) and token (β) to be substituted for the matched stringlet. Accordingly, progression controller 327 outputs an advance signal (i.e., multi-bit signal) to advance the contents of comparand buffer 321 and pre-buffer 307 by 15 symbols, and also asserts the encode signal to cause output multiplexer 325 to pass the token into the output stream in place of the matched (head-of-queue) symbols—in effect compressing the output stream by N−1 symbols relative to the input stream, where N is the symbol length of the matched symbol and assuming a token bit width that matches the symbol bit width (non-matching token/symbol widths may be used in alternative embodiments or configurations). The resulting pre-buffer, comparand buffer and output stream status is shown at 334.

Figure 11:
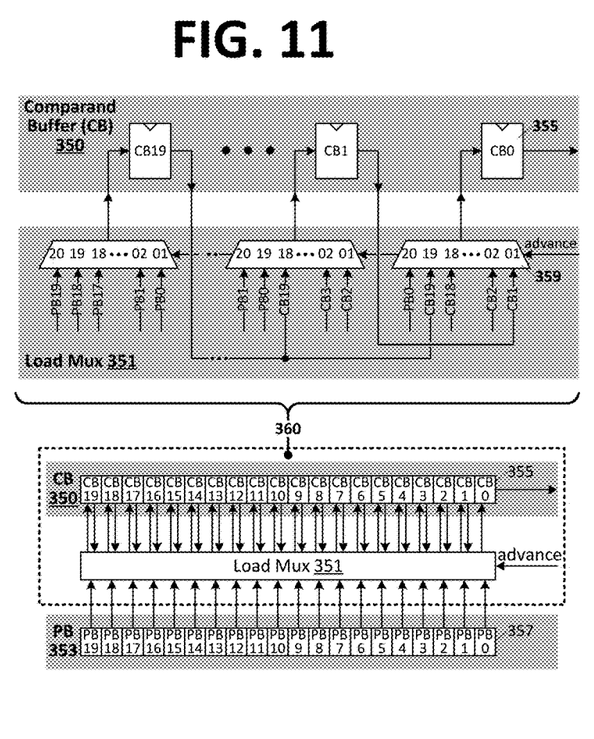
FIG. 11 illustrates an exemplary disposition and interconnection of a load multiplexer with respect to a 20-symbol comparand buffer and a 20-symbol pre-buffer.

FIG. 11 illustrates an exemplary disposition and interconnection of a load multiplexer 351 with respect to a 20-symbol comparand buffer 350 and 20-symbol pre-buffer 353. The comparand buffer 350, load multiplexer 351 and pre-buffer 353 may be used to implement the comparand buffer, load multiplexer and pre-buffer components shown in FIGS. 9 and 10, and may provide for storage and variable-loading of more or fewer than 20 symbols in alternative embodiments, and the two buffers may have disparate (non-uniform) storage capacities. As with load multiplexer 323 of FIG. 10, load multiplexer 351 is coupled to receive respective symbols from constituent symbol-storage elements 357 within pre-buffer 353 and from constituent symbol-storage elements 355 within comparand buffer 350, except for head-of-queue storage element ('CB0'). Referring to conceptual view 360, load multiplexer 351 may be implemented by a bank of multiplexers 359 each feeding a selected one of 20 upstream (or more latent) symbols to the input of a respective comparand buffer symbol storage 355 in accordance with the advance signal from a progression controller (not depicted in FIG. 11). As shown, the output of each comparand symbol storage element 355 (except head-of-queue element CB0) is coupled to the single-symbol advance port of the multiplexer 359 for the downstream symbol so that, when a CAM miss occurs, an advance value of '01' will shift the contents of the comparand buffer 321 forward by a single symbol, drawing the head-of-queue value from pre-buffer 357 (i.e., PB0) into queue-tail comparand symbol storage element CB19. In the event of a CAM hit, the advance value enables progression by a variable number of symbols (from 2 to 20 in this case, according to permitted stringlet lengths so that different minimum and/or maximum advance values may apply in alternative embodiments), with inputs ports of each multiplexer 359 coupled to receive respective outputs of downstream comparand buffer and pre-buffer storage elements.

Figure 12:
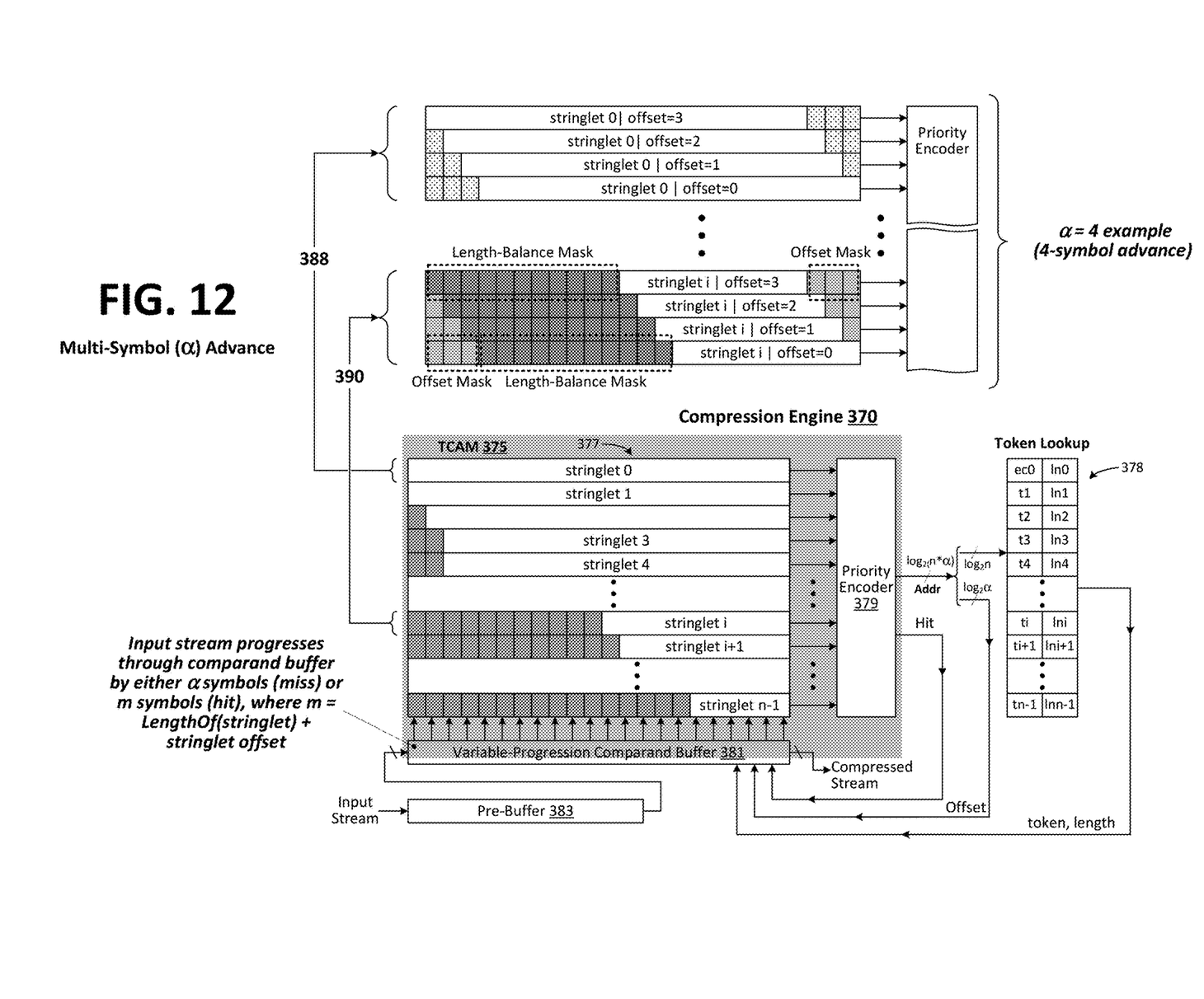
FIG. 12 illustrates an embodiment of a compression engine that implements a multiple-symbol advance following each compare cycle, progressing by a predetermined or programmable number of symbols ($\alpha$) in response to a ternary CAM miss, and by stringlet-length symbols (m) in response to a CAM hit.

FIG. 12 illustrates an embodiment of a compression engine 370 that implements a multiple-symbol advance following each compare cycle, progressing by a predetermined or programmable number of symbols ($\alpha$) in response to a ternary CAM (TCAM) miss, and by stringlet-length symbols (m) in response to a TCAM hit. With some exceptions, the constituent components of compression engine 370—TCAM 375, token-lookup table 378, variable-progression comparand buffer 381 and pre-buffer 383—operate as discussed above with respect to TCAM 301, token-lookup table 309, variable progression comparand buffer 305 and pre-buffer 307, respectively, in reference to FIG. 9, with multi-symbol progression enabled primarily through modified storage of the stringlet search database within CAM cell array 377. More specifically, multiple ($\alpha$) symbol-staggered instances of each stringlet are stored in contiguous TCAM rows as shown in the examples at 388 and 390 for stringlets '0' and 'i', respectively, so that an instance of the stringlet at any of the corresponding $\alpha$ symbol-staggered positions within the comparand buffer will yield a hit with respect to one of the symbol-staggered stringlets within TCAM 375. In effect, increased search parallelism is achieved at the cost of search database expansion as multiple ($\alpha$) compare operations are executed with respect to the stringlet database in each compare cycle—one for each symbol-staggered position of the stored stringlet—and the stringlet database is correspondingly increased by a factor of $\alpha$. Because a match (hit) with respect to a stored stringlet may result from any one of its symbol-staggered instances, the priority-encoded address of the hit indicates not only the stringlet that yielded the hit, but also the specifically matched one of the $\alpha$ instances of that stringlet and thus the offset of that matching stringlet with respect to the right-justified edge of CAM cell array 377. Where $\alpha$ is a power-of-two value (i.e., $\log_2(\alpha)$ is an integer), for example, the least significant bits (i.e., $\log_2(\alpha)$ bits) of the priority-encoded address specify the stringlet offset, 0 to $\alpha-1$, and are returned to the variable-progression comparand buffer 381 to control multi-symbol advance and compressed stream output. Where a is not a power-of-two value, the most significant offset bit may also serve as the least significant table lookup bit (i.e., the one bit of the PE-generated match address is supplied to both the token lookup and the variable-progression comparand buffer). Relative significance of the offset and address components of the priority-encoder output may be different from that shown in alternative embodiments, particularly where match lines are differently prioritized within priority encoder 379.

In addition to increasing the TCAM row count for a given stringlet database (i.e., by a factor of $\alpha$), the multi-symbol-advance compression approach shown in FIG. 12 also increases the maximum row width, requiring $\alpha-1$ additional characters to account for the symbol-staggered storage. In the $\alpha=4$ example shown, for instance, an offset mask of $\alpha-1$ symbols is stored with respect to each stringlet, padding the right and left ends of the storage as shown to account for the symbol-staggered storage of $\alpha$ stringlet instances.

Figure 13:
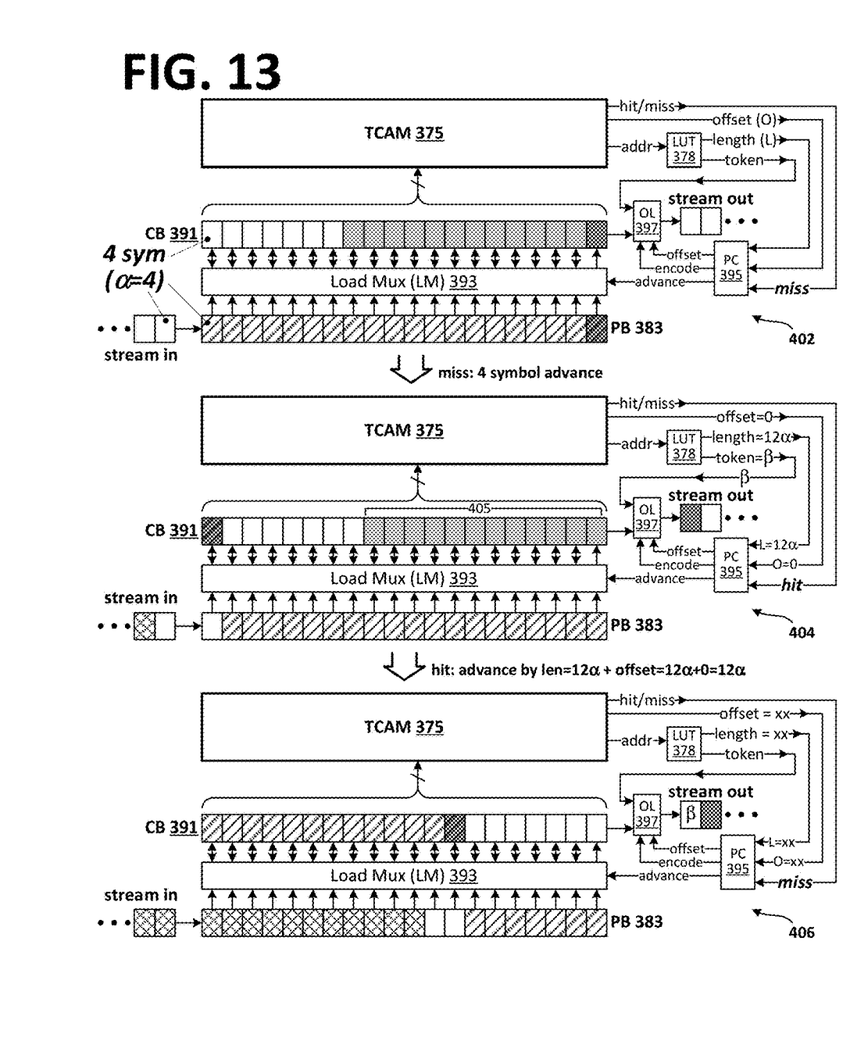
FIG. 13 illustrates an exemplary stream progression through compression engine of FIG. 12 assuming a progression factor of $\alpha=4$.

FIG. 13 illustrates an exemplary stream progression through compression engine 370 of FIG. 12 assuming (i) a progression factor of $\alpha=4$ (larger or smaller minimum-progression values may be implemented or programmably selected) and (ii) that variable progression comparand buffer 381 is implemented by a comparand buffer 391, load multiplexer 393, output logic circuit 397 and progression controller 395 as shown. In contrast to the progression example in FIG. 10, each of the discrete elements shown with in the pre-buffer and comparand buffer represents storage of $\alpha$ symbols (four symbols in this example), instead of just one. Also, as shown, progression controller 395 receives the offset value (lowest-order address bits) from ternary CAM 375 in addition to the hit/miss signal, and outputs both an encode signal and an offset signal to output logic 397.

Continuing with FIG. 13 and referring specifically to the configuration shown at 402 (i.e., following a CAM miss), the compression engine advances the input stream through the pre-buffer 383 and comparand buffer 391 by the minimum progression value, $\alpha$, and thus by four symbols in this case. More specifically, upon receiving the 'miss' signal from TCAM 375, progression controller 395 deasserts the encode signal and outputs an advance=4 signal to evict the four head-of-queue symbols within the comparand buffer into the output stream (i.e., via output logic 397) and to shift the four head-of queue symbols within pre-buffer 383 into the tail locations of comparand buffer 391 to yield the configuration shown at 404. In the ensuing search (i.e., while in configuration 404), the shaded contents of the comparand buffer (405) produce a TCAM hit, in this case matching a string length of 12$\alpha$ symbols (48 symbols in this $\alpha=4$ example), an offset value of zero and a token value, $\beta$. Accordingly, progression controller 395 (i) asserts the encode signal and a zero-offset value to insert the token ($\beta$) into the output stream in place of comparand buffer content, and (ii) outputs an advance signal to shift the contents of pre-buffer 383 and comparand buffer 391 forward by 12$\alpha$ symbols, evicting the shaded comparand buffer content 405 from comparand buffer 391 to yield the buffer configuration and output stream content shown at 406. In the ensuing TCAM miss, the progression controller again deasserts the encode signal (and sets the advance signal) to shift contents of the pre-buffer and comparand buffer forward by $\alpha$ symbols, evicting the $\alpha$ head-of-queue symbols from the comparand buffer into the output stream.

Figure 14:
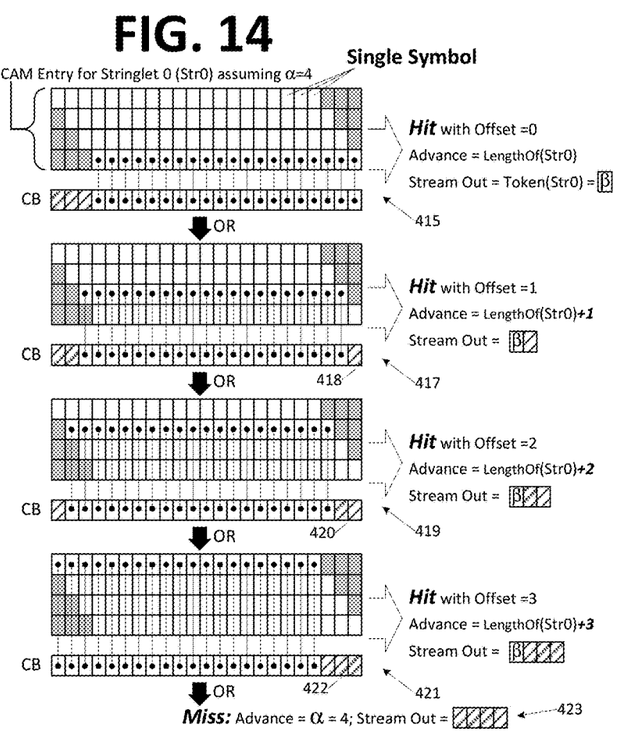
FIG. 14 illustrates more detail with respect to operation of the variable progression comparand buffer of FIG. 12, showing an exemplary output stream progression in each of $\alpha$ possible offset scenarios following a TCAM hit as well as output stream progression following a TCAM miss.

FIG. 14 illustrates more detail with respect to operation of the variable progression comparand buffer (CB) of FIG. 12, showing an exemplary output stream progression in each of $\alpha$ possible offset scenarios (four scenarios in this case) following a TCAM hit as well as output stream progression following a TCAM miss. In contrast to FIG. 13 in which each comparand buffer/pre-buffer element is assumed to contain $\alpha$ symbols, each storage element shown in the TCAM excerpt of FIG. 14 (showing a symbol-staggered instances of stringlet zero) and comparand buffer is assumed to store a single symbol. Thus, in the zero-offset match scenario shown at 415, the TCAM asserts a hit signal and zero-offset signal to signal a match between comparand buffer content and 0-offset (right-justified) instance of stored stringlet 0. The progression controller responds to the hit and zero-offset by setting the advance signal according to the length of the matched stringlet (i.e., the length value returned by the lookup table), and asserts the encode signal (and passes the zero-offset value) to cause the output logic circuit to pass the counterpart token for stringlet 0 (i.e., β) into the output stream.

Still referring to FIG. 14, in the one-symbol offset match scenario shown at 417, the TCAM asserts the hit signal and outputs an offset value of 1 to signal a match between the comparand buffer content and the one-symbol-offset instance of stored stringlet zero. The progression controller responds by setting the advance signal according to the length of the matched stringlet plus the offset value (LengthOf(Str0)+1), thus evicting both the matched comparand content and the head-of-queue symbol 418 (i.e., the symbol that occupies the masked offset position within the matched stringlet entry) from the comparand buffer. The progression controller also passes the one-symbol offset value to output logic and raises the encode signal so that the output logic circuit passes queue-head symbol 418 into the output stream followed by the paired token.

The two-symbol and three-symbol offset match scenarios at 419 and 421 follow the same pattern as the single-symboloffset match in scenario 417, with the progression set to the stringlet length plus offset value (2 or 3, respectively), and the stream output consisting of the two or three offsetmasked symbols from the comparand buffer queue head (i.e., 420 or 422), followed by the token for stringlet 0. Finally, in the event of a miss, the four head-of-queue symbols (i.e., a symbols) are evicted from the comparand buffer into the output stream as shown at 423.

Figure 15:
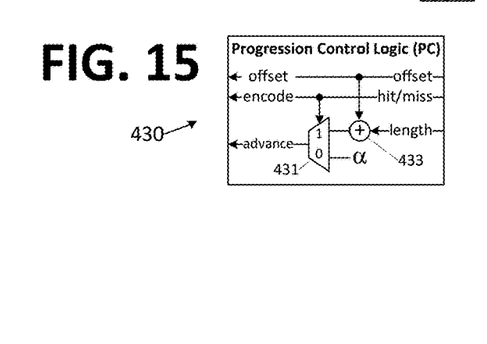
FIG. 15 illustrates a progression control logic embodiment that may be used to implement the progression controller of FIG. 13.

FIG. 15 illustrates a progression control logic embodiment 430 that may be used to implement progression controller 395 of FIG. 13. As shown, the incoming hit/miss signal is passed to the progression controller output as the encode signal (i.e., hit/miss signal constitutes the "encode" signal) and is also supplied to multiplexer 431 to select either the minimum progression value (α) or stringletlength-plus offset value (the latter generated by summing circuit 433) as the advance signal output. The incoming offset value passes directly to the progression controller output and is also supplied to summing circuit 433 where it is summed with the incoming stringlet length value to generate the stringlet-length-plus-offset value supplied to the alternate input of multiplexer 431. Various other architectural arrangements and/or component circuit blocks may be used to implement the progression controller in alternative embodiments.

Figure 16:
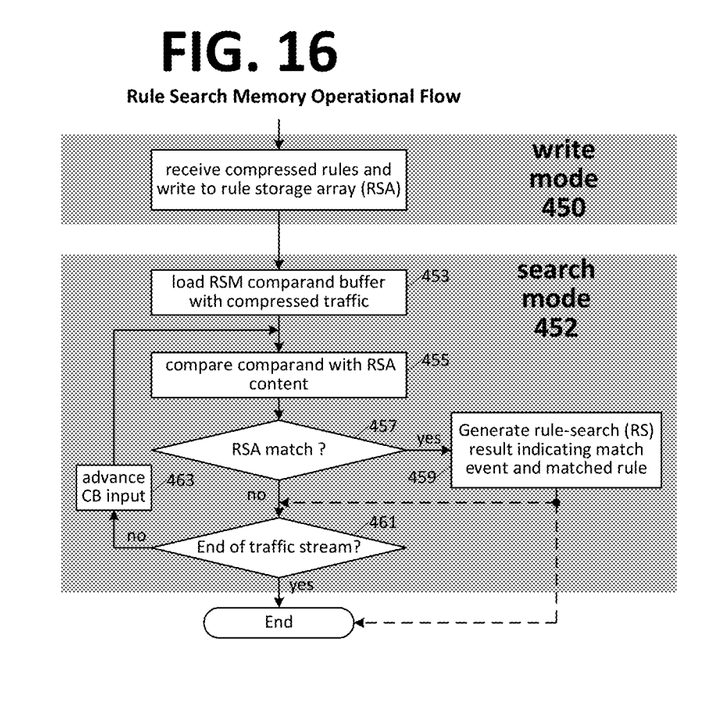
FIG. 16 illustrates an exemplary operational flow within a multi-modal rule search memory, showing the write mode reception and storage of compressed rules, and search mode operation.

As discussed, various rule search memory embodiments may be operated modally, receiving and storing compressed rules in write mode and executing search operations with respect to the stored rule database in search mode. FIG. 16 illustrates an exemplary operational flow within such a multi-modal rule search memory, showing the write mode reception and storage of compressed rules (thus effecting storage of a compressed rule database within a rule storage array) at 450, and search mode operation at 452. In the depicted operational flow, the rule search memory is implemented by one or more content addressable memories (which may themselves be implemented by commodity CAM components and/or programmatically instantiated CAM components, as in a PLD, PGA or FPGA component programmed to implement a CAM) having a collective 'RSM' comparand buffer. Accordingly, at 453 within the search mode flow, the RSM comparand buffer is loaded with compressed traffic (e.g., traffic shifted into the RSM comparand buffer in successive compare cycles), and at 455 the comparand buffer content ("comparand") is compared with the rule storage array content. If a match is detected (affirmative determination at 457), a rule search result is generated at 459 and output to indicate the match event and matched rule. Depending on policy control setting and/or RSM implementation, affirmative match detection may or may not result in blocking of the subject traffic flow. If the traffic flow is to be blocked (disallowed) following affirmative malware-match detection, search mode operation of the RSM may terminate with respect to that flow. Alternatively, if traffic flow is not to be blocked (e.g., allowed for forensic or other testing or diagnostic reasons, or upon determination that the subject malware detection event shall not by itself cause the traffic flow to be blocked) or if no match is detected at 457, the traffic stream is evaluated at 461 to determine whether stream-end has been reached. If not, the traffic stream is advanced within the comparand buffer at 463 and the operational sequence starting at 455 is repeated.

Figure 17:
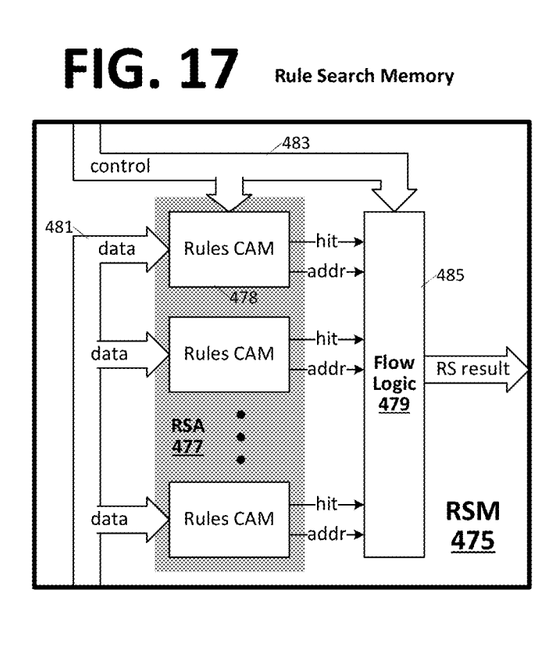
FIG. 17 illustrates an embodiment of a rule search memory having a rule storage array and a flow logic component.

FIG. 17 illustrates an embodiment of a rule search memory 475 having a rule storage array 477 and a flow logic component 479. In the particular embodiment shown, rule storage array 477 includes a plurality of rules-CAM components 478 each coupled to receive data (rules or live traffic stream) via a shared data port input 481, and each coupled to receive control information (e.g., search-mode/write-mode control, as well as configuration control values) via a control port 483. As noted above, any or all of the rules CAMs 478 may be implemented by a programmable logic device (PLD, PGA, FPGA), but in any case execute highly parallel compare operations (e.g., searching the entire RSA rule content in each a single compare cycle, for example) to yield respective hit and address signals ('hit' and 'addr'). Flow logic 479 serves, among other purposes, to merge the hit and address outputs of individual rules CAMs 478 into a finalized rule-search result, for example, by prioritizing between rules CAMs 478 where multiple rules CAMS assert a match indication within the same compare cycle.

Figure 18:
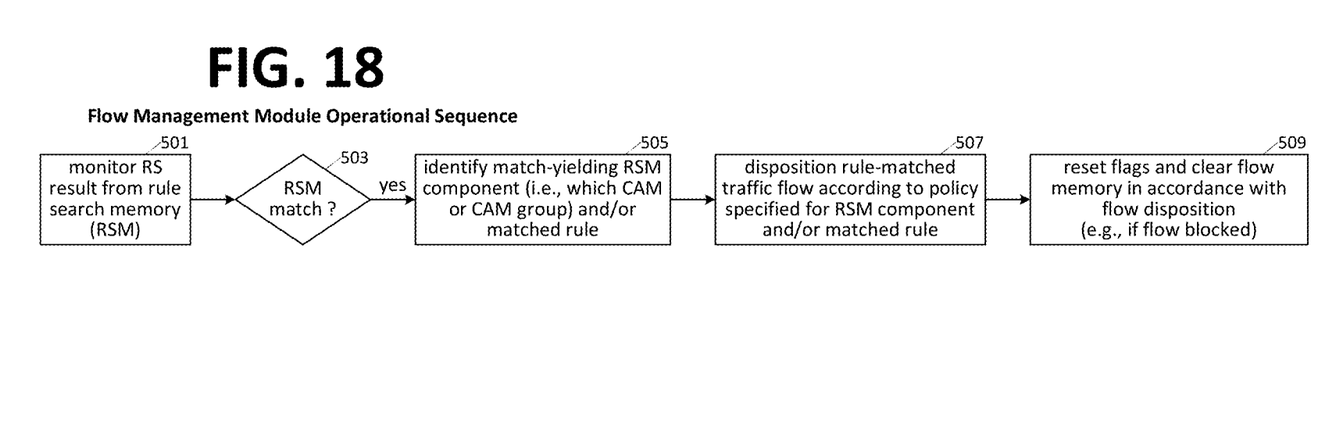
FIG. 18 illustrates an exemplary operational sequence within the flow management module of FIG. 1 in the context of the malware-detection embodiments described in reference to FIGS. 2-17.

As discussed in reference to FIG. 1, a flow management module (131) may respond to the rule-search result from a rule search memory in accordance with various policy controls, in some cases blocking malware-laden traffic flows (i.e., as indicated by the rule search result) and in others permitting all or some of the flow to continue. FIG. 18 illustrates an exemplary operational sequence within the flow management module of FIG. 1 in the context of the malware-detection embodiments described above. Starting at 501, the flow management module monitors the rulesearch result from the rule search memory (RSM), identifying the match-yielding RSM component and/or matched rule at 505 in response to an affirmative match detection at 503. At 507, the flow management module dispositions the rule-matched traffic flow according to policy for the identified RSM component and/or matched rule. At 509, the flow management module resets internal flags and clears the flow memory in accordance with the policy-indicated flow disposition (e.g., clearing the memory and resetting flags if the flow is to be blocked in response to the malware detection confirmed at 503).

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

Any of the various methodologies disclosed herein and/or user interfaces for configuring and managing same may be implemented by dedicated hardware and/or machine execution of one or more sequences of instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 1. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "engine" or "logic engine" as used herein refers broadly to one or more components implemented by dedicated hardware, programmed processor(s), or any combination of dedicated hardware and programmed processor(s). Any of the specific memory or storage sizes, signal path widths, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Device or component "programming" can include, for example and without limitation, loading a control value into a register or other storage circuit within the device or component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device or component. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A malware detection apparatus comprising:
   an interface to receive an input traffic stream;
   ternary content addressable memory (TCAM) cells;
   a comparand buffer;
   a match-signal output;
   a look-up memory; and
   first circuitry to:
      load into the comparand buffer, as a first comparand, a first plurality of fixed-size values from the input traffic stream;
      trigger, within the TCAM cells, a comparison of the data patterns with the first comparand to produce a first match signal at the match-signal output; and
      if the first match signal indicates match between the first comparand and one of the data patterns, select from the look-up memory a token value and length value corresponding to the one of the data patterns, and
      output the token value to be part of a compressed traffic stream in place of a first subset of the fixed-size values, the first subset including a quantity of the fixed-size values according to the length value.

2. The malware detection apparatus of claim 1 further comprising second circuitry to advance a second subset of the fixed-size values within the comparand buffer and load additional fixed-size values, selected from the input traffic stream in a quantity according to the length value, into the comparand buffer.

3. The malware detection apparatus of claim 2 further comprising a pre-buffer and circuitry to shift the input traffic stream through the pre-buffer, and the second circuitry to load the additional fixed-size values into the comparand buffer comprises a multiplexing circuit to conduct the additional fixed-size values from respective storage elements within the pre-buffer to contiguous storage elements within the comparand buffer, the contiguous storage locations matching the length value in quantity and including a tail storage element of the comparand buffer.

4. The malware detection apparatus of claim 2 wherein the additional fixed-size values form, together with second subset of the fixed-size values, a second comparand, and wherein the second circuitry is further to trigger, within the TCAM cells, a comparison of the data patterns with the second comparand.

5. The malware detection apparatus of claim 1 wherein the first circuitry comprises circuitry to output one of the fixed-size values from a head storage element of the comparand buffer to form part of the compressed traffic stream if the first match signal indicates mismatch between the first comparand and the data patterns.

6. The malware detection apparatus of claim 5 wherein the first circuitry comprises circuitry to shift, in response to the indication of mismatch between the first comparand and the data patterns, a remainder of the fixed-size values forward within the comparand buffer and load an additional fixed-size value, selected from the input traffic stream, into a tail storage element of the comparand buffer, the remainder of the fixed-size values and the additional fixed-size value constituting a second comparand.

7. The malware detection apparatus of claim 1 wherein the token value is constituted by a quantity of bits that matches a quantity of constituent bits within each one of the fixed-size values.

8. The malware detection apparatus of claim 1 wherein the TCAM cells, comparand buffer and match-signal output implement at least part of a first TCAM within the malware detection apparatus, the malware detection apparatus further comprising a second TCAM, distinct from the first TCAM, to compare the compressed traffic stream with a compressed set of malware signatures.

9. The malware detection apparatus of claim 8 wherein the second TCAM to compare the compressed traffic stream with the compressed set of malware signatures within a second TCAM comprises:
    a comparand buffer and circuitry to incrementally shift the compressed traffic stream through the comparand buffer of the second TCAM to produce a succession of comparand values within the comparand buffer of the second TCAM, and
    TCAM cells to compare each comparand value of the succession of comparand values with the compressed set of malware signatures in successive search cycles.

10. The malware detection apparatus of claim 1 wherein the TCAM cells, comparand buffer, match-signal output and look-up memory implement at least part of an integrated-circuit TCAM.

11. A method of operation within a malware detection apparatus, the method comprising:
    loading, into a comparand buffer of a ternary content addressable memory (TCAM) as a first comparand, a first plurality of fixed-size values from an input traffic stream;
    comparing the first comparand with data patterns stored within respective entries of the TCAM to produce a first match signal; and
    if the first match signal indicates match between the first comparand and one of the data patterns, selecting a token value and length value corresponding to the one of the data patterns and outputting the token value to be part of a compressed traffic stream in place of a first subset of the fixed-size values, the first subset including a quantity of the fixed-size values according to the length value.

12. The method of claim 11 further comprising advancing a second subset of the fixed-size values within the comparand buffer and loading additional fixed-size values, selected from the input traffic stream in a quantity according to the length value, into the comparand buffer.

13. The method of claim 12 further comprising shifting the input traffic stream through a pre-buffer, and wherein loading the additional fixed-size values into the comparand buffer comprises conducting, via a multiplexing circuit, the additional fixed-size values from respective storage elements within the pre-buffer to contiguous storage elements within the comparand buffer, the contiguous storage locations matching the length value in quantity and including a tail storage element of the comparand buffer.

14. The method of claim 12 wherein the additional fixed-size values form, together with second subset of the fixed-size values, a second comparand, the method further comprising comparing the second comparand with the data patterns stored within respective entries of the TCAM.

15. The method of claim 11 further comprising outputting one of the fixed-size values from a head storage element of the comparand buffer to form part of the compressed traffic stream if the first match signal indicates mismatch between the first comparand and the data patterns.

16. The method of claim 15 further comprising, if the first match signal indicates mismatch between the first comparand and the data patterns, shifting a remainder of the fixed-size values forward within the comparand buffer and loading an additional fixed-size value, selected from the input traffic stream, into a tail storage element of the comparand buffer, the remainder of the fixed-size values and the additional fixed-size value constituting a second comparand.

17. The method of claim 11 wherein the token value is constituted by a quantity of bits that matches a quantity of constituent bits within each one of the fixed-size values.

18. The method of claim 11 wherein the TCAM constitutes a first TCAM within the malware detection apparatus, the method further comprising comparing the compressed traffic stream with a compressed set of malware signatures within a second TCAM.

19. The method of claim 18 wherein comparing the compressed traffic stream with the compressed set of malware signatures within the second TCAM comprises incrementally shifting the compressed traffic stream through a comparand buffer of the second TCAM to produce a succession of comparand values within the comparand buffer of the second TCAM, and comparing each comparand value of the succession of comparand values with the compressed set of malware signatures in successive search cycles.

20. A malware detection apparatus comprising:
    ternary content addressable memory (TCAM) cells;
    a comparand buffer;
    a match-signal output;
    a look-up memory; and
    means for:
        receiving an input traffic stream;
        loading into the comparand buffer, as a first comparand, a first plurality of fixed-size values from the input traffic stream;
        triggering, within the TCAM cells, a comparison of the data patterns with the first comparand to produce a first match signal at the match-signal output; and if the first match signal indicates match between the first comparand and one of the data patterns, selecting from the look-up memory a token value and length value corresponding to the one of the data patterns, and outputting the token value to be part of a compressed traffic stream in place of a first subset of the fixed-size values, the first subset including a quantity of the fixed-size values according to the length value.

\* \* \* \* \*